US006371333B2

(12) United States Patent

Lorscheidt et al.

(10) Patent No.: US 6,371,333 B2
(45) Date of Patent: *Apr. 16, 2002

(54) DISPENSING PUMP, DISPENSER AND DISPENSER UNIT-ASSEMBLY

(75) Inventors: Willi Lorscheidt; Matthias Prox, both of Pulheim; Manuel Czech, Donaustauf, all of (DE)

(73) Assignee: Josef Wischerath GmbH & Co. KG, Pulheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/527,694

(22) Filed: Mar. 17, 2000

Related U.S. Application Data

(63) Continuation of application No. PCT/EP98/06062, filed on Sep. 23, 1998.

(30) Foreign Application Priority Data

Sep. 23, 1997 (DE) .................................... 297 17 034 U

(51) Int. Cl.[7] .................................................. G01F 11/06
(52) U.S. Cl. .................................................... 222/321.9
(58) Field of Search .......................... 222/321.7, 321.9, 222/256

(56) References Cited

U.S. PATENT DOCUMENTS 4,402,431 A * 9/1983 Wiegner et al. ............ 222/207
4,838,460 A * 6/1989 Moore et al. ........ 222/321.7 X
4,872,596 A * 10/1989 Corsette ..................... 222/256
4,903,868 A * 2/1990 Ichihara et al. ......... 222/387 X
4,911,336 A * 3/1990 Blake ...................... 222/321.7
4,991,744 A * 2/1991 Von Schuckmann .... 222/256 X
4,991,746 A 2/1991 Schultz
4,993,214 A 2/1991 Corba
5,085,350 A * 2/1992 Sugita ........................ 222/260
5,158,211 A * 10/1992 Meshberg ............ 222/321.7 X
5,265,771 A 11/1993 Meshberg
5,307,962 A * 5/1994 Lin ......................... 222/321.9
5,462,208 A * 10/1995 Stahley et al. ....... 222/321.9 X
5,664,703 A * 9/1997 Reifenberger et al. ................. 222/321.7 X
5,875,932 A * 3/1999 Meshberg ............ 222/321.7 X
5,927,561 A * 7/1999 Foster et al. ............ 222/321.9
5,988,453 A * 11/1999 Da Laforcade et al. .. 222/321.9
6,073,814 A * 6/2000 Fuchs ................. 222/321.9 X

FOREIGN PATENT DOCUMENTS

DE G 92 12 242.6 1/1993
DE G 94 19 268.5 3/1995
EP 0 073 918 A1 3/1983
EP 0 230 252 A2 7/1987
EP 0 340 724 A2 11/1989
EP 0 345 458 A2 12/1989
EP 0 368 112 A2 5/1990
EP 0 378 286 A2 7/1990
EP 0 410 857 A1 1/1991
EP 0 707 894 A1 4/1996
EP 0 733 559 A1 9/1996
FR 2 482 207 11/1981
GB 2 083 142 A 3/1982
JP 64-70383 * 3/1989 ................ 222/321

* cited by examiner

*Primary Examiner*—Henry C. Yuan
*Assistant Examiner*—John Bastianelli
(74) *Attorney, Agent, or Firm*—Lawrence E. Laubscher

(57) ABSTRACT

A dispensing pump implemented as modular functional unit comprises a piston body (10) having a piston section (11) and a cylinder body (20) having a cylinder section (21). The piston section (11) is slidably accommodated in the cylinder section (21). Both said elements define a pump chamber (30) together. An inlet channel (24) and an outlet channel (14) are connected via the pump chamber (30). A respective check valve (31, 32) is arranged in each of said channels (14, 24). Limiting devices (12, 22), which are adapted to be brought into engagement with one another, are provided on said piston body (10) and said cylinder body (20). In addition, a dispenser and a dispenser unit-assembly system are suggested.

15 Claims, 6 Drawing Sheets

DISPENSING PUMP, DISPENSER AND DISPENSER UNIT-ASSEMBLY

REFERENCE TO RELATED APPLICATION

This application is a continuation of the PCT application No. PCT/EP98/06062 filed Sep. 23, 1998, based on a German priority application No. 297 17 034.1 filed Sep. 23, 1997.

BACKGROUND OF THE INVENTION

1. Field of the Invention

The present invention relates to dispensers operating according to the pump principle. In addition, the present invention refers to a dispensing pump itself as well as to a dispenser unit-assembly.

2. Brief Description of the Prior Art

Dispensers operating according to the pump principle are generally known from the prior art. Such dispensers are provided with a pumping head and a storage container connected thereto. Up to now, the storage container and the pumping head have, however, been individually adapted to one another in the case of such dispensers so that one pumping head always matches only one specific storage container. The design and manufacturing expenditure for such dispensers is correspondingly high.

In view of the manifold possibilities of use of dispensers, there is, however, an interest in reducing this expenditure.

SUMMARY OF THE INVENTION

Hence, it is the object of the present invention to create a dispensing pump having manifold uses. Furthermore, it is the object of the present invention to provide a suitable dispenser as well as a dispenser unit-assembly.

This object is achieved by a dispensing pump implemented as modular functional unit and comprising a piston body having a piston section and a cylinder body having a cylinder section, said piston section being slidably accommodated in said cylinder section and both said elements defining a pump chamber together, further comprising an inlet channel and an outlet channel connected via the pump chamber, a respective check valve being arranged in each of said channels, and still further comprising a resetting device arranged between the piston body and the cylinder body as well as limiting devices which are provided on said piston body and said cylinder body and which are adapted to be brought into engagement with one another.

In this way, a particularly compact dispensing pump is obtained, which is adapted to be used with a large number of dispensers whose head piece and storage container can have an arbitrary structural design.

Preferably, the limiting devices come into contact with one another when the maximum pump-chamber volume has been reached so as to limit the relative movement between the piston body and the cylinder body beyond the maximum pump-chamber volume. Due to the fact that the limiting devices are formed on the piston and on the cylinder body, additional holding elements, which are often used in the prior art, can be avoided. This will reduce the variety of parts used in the dispensing pump so that it will suffice to have a smaller number of parts in stock and so that a more efficient assembly will be possible. The limiting devices also serve the purpose of preventing the pump from falling apart.

Preferably, the piston body and the cylinder body are each bell-shaped, one of them being inside the other, said piston body and said cylinder body defining the modular dispensing pump. The limiting projections restrict the mamximum pump-chamber volume. Due to the bell-shaped configuration, the dispensing pump has a capsular structural design on the outer side thereof, which contributes to a reduction of the structural volume. A dispensing pump having this kind of structural design can be used with a great variety of different dispensers.

The axial overall length of the dispensing pump is shorter in the compressed condition than in the extended condition where the pump chamber has its maximum volume. Hence, the dispensing pump can be used with dispensers in which, when a dispensing key is being pressed down, also the outlet opening moves as well as with dispensers in which the outlet opening is not movable.

Preferably, the two check valves of the dispensing pump are implemented as annular gap valves with annular valve bodies. This permits the medium to flow uniformly into the pump chamber and a discharge channel so that, especially in the case of pasty media, asymmetric dead zones in the flow path will be avoided.

According to a further advantageous embodiment of the present invention, the limiting devices on the piston body and the cylinder body are provided as projections on opposed walls, said projections being in sliding engagement with the respective opposed wall so as to improve the guiding effect and so as to prevent the piston-cylinder arrangement from tilting. This permits a long service life of the re-usable dispensing pump.

The above-mentioned object is also achieved by a dispenser for dispensing flowable, e.g. fluid and/or pasty media, said dispenser comprising a storage container provided with a storage chamber for accommodating the medium to be dispensed, a head piece provided with a dispensing opening, and a pumping means provided with a pump chamber delimited by check valves on the inlet as well as on the outlet side thereof, the pumping means being implemented as a modular dispensing pump and being adapted to be connected to the head piece and/or the storage container via locking connections or screw connections.

Due to the fact that the storage chamber provided in the storage container is delimited by an outer wall of the dispensing pump in the axial direction, a corresponding wall on the storage container can be dispensed with. The storage container can thus be manufactured more easily. Due to the modular structural design of the storage container, the dispensing pump and the head piece, the dispensing pump can be assembled separately from the other parts so that, subsequently, it can be assembled with the storage container and the head piece in an efficient manner.

In the above-mentioned dispenser, the storage container is preferably implemented as a cylindrical body having at the top end thereof an upper opening, which extends across the whole cross-section of the storage chamber. For example, a follow-up piston delimiting the storage chamber or an insert container with a follow-up piston can be inserted into the storage container from the top end thereof in this way. The storage container can then also be filled from this side so that all the assembly steps can be carried out from the same side of the storage container.

According to a preferred embodiment of the dispenser, the head piece is fixed directly to the storage container in the assembled condition. Forces acting on the head piece from outside can thus be prevented from being transmitted directly on the dispensing pump. In addition, the fixing force that can be realized between the head piece and the storage container is stronger than the fixing force which could be realized if the head piece were fixed directly to the dispensing pump, since, if the dispenser is reused, i.e. if the storage container is exchanged or refilled and the head piece released, there will be no risk of damage being caused to the dispensing pump. Hence, a stronger fixing force between the head piece and the storage container can be chosen so that the head piece is saveguarded against being lost with a high degree of reliability.

Preferably, the separate dispensing pump is provided with at least one fastening projection abutting on the storage container and on the head piece in the assembled condition. This has the effect that the dispensing pump is secured in position in the dispenser without being fixedly connected to the head piece or the storage container. This will substantially simplify the assembly, since the dispensing pump only has to be inserted between the storage container and the head piece, whereas the fixing in position of said dispensing pump will be effected by fixing the head piece to the storage container. Alternatively, the dispensing-pump part arranged on the side of the storage chamber can also be secured to the storage container itself.

According to one advantageous further development of the dispenser, a bellows enclosing the medium to be dispensed is arranged in the storage container. The medium to be dispensed is therefore no longer in direct contact with the inner wall of the storage container, but the storage chamber is provided within the bellows. This permits simple and neat filling and especially refilling of the storage container.

Furthermore, the above-mentioned object is achieved by a dispenser unit-assembly system comprising head pieces, storage containers and at least one pumping means or dispensing pump, a respective head piece, storage container and dispensing pump defining together a dispenser in the case of which various head pieces can be combined with the same pumping means.

Advantageous further developments of the present invention are disclosed in the additional subclaims and the description following hereinbelow.

BRIEF DESCRIPTION OF THE DRAWINGS

In the following, the present invention will now be described on the basis of embodiments making reference to the drawing, in which.

DETAILED DESCRIPTION

Figure 1:
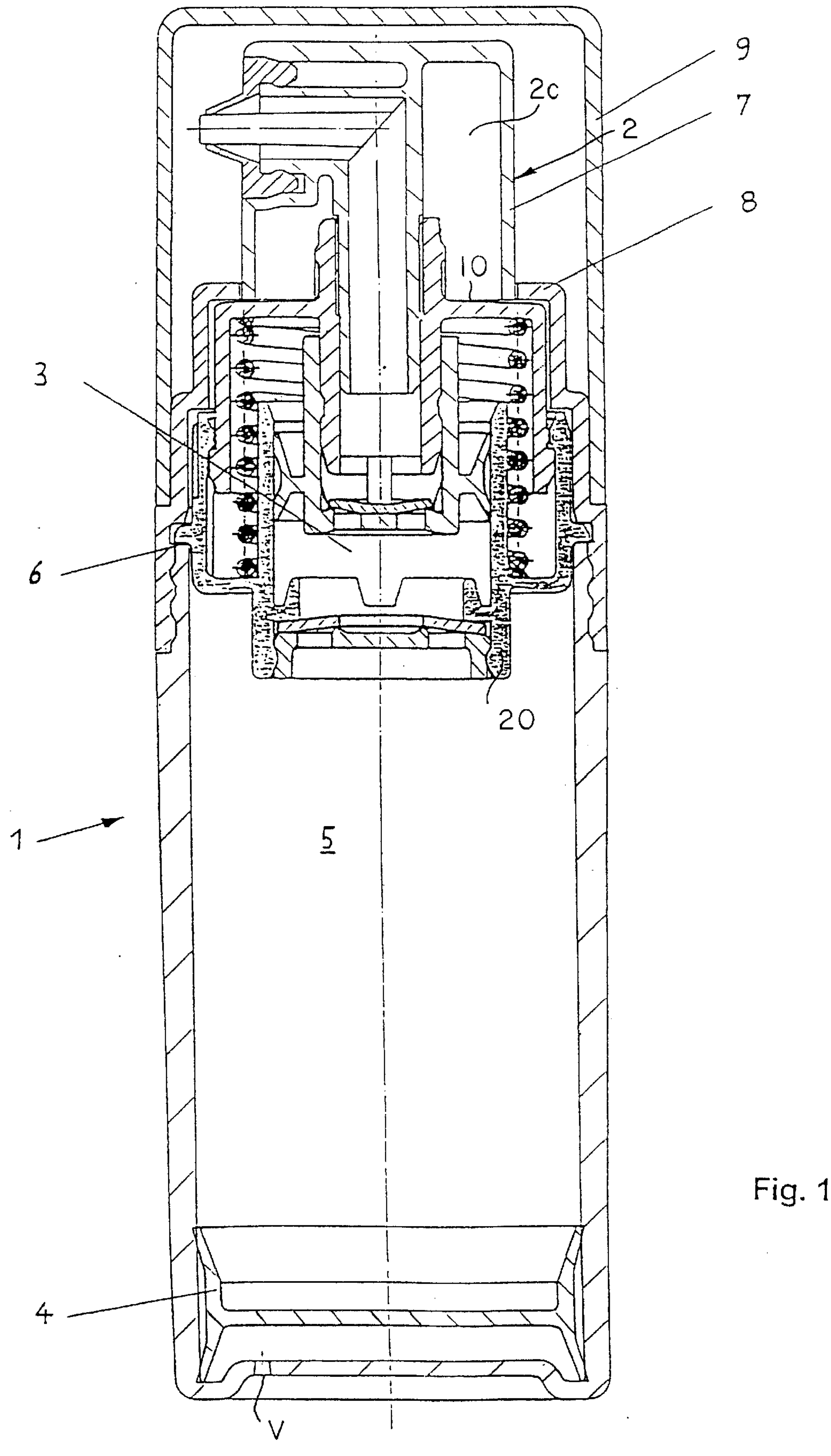
FIG. 1 shows a first embodiment of a dispenser in the assembled condition.

The dispenser in FIG. 1 is composed of a storage container 1, a head piece 2 and a pumping means or dispensing pump 3. The storage container 1 is implemented as an essentially cylinderlike body having a storage chamber 5 provided therein. This storage chamber 5 is delimited by a follow-up piston 4 on the bottom side thereof. At the top end of the storage container an upper opening 6 is provided into which the dispensing pump 3 can be inserted. The follow-up piston 4 can be introduced in the storage container through the upper opening 6. Said upper opening 6 is also used for filling the storage container shown. In the embodiment shown, the storage container is closed by a wall on the bottom side thereof, said wall having only provided therein a vent V. This is particularly advantageous in cases where, as will be shown in the second embodiment described hereinbelow, a bellows containing the medium to be dispensed is inserted in the storage container 1. The bottom wall then also serves to protect the bellows. Alternatively, the storage container can, however, be implemented in the usual way without a bottom wall; in this case, the storage container will be filled and the follow-up piston 4 will be inserted from the bottom side.

The interior of the storage container 1 is delimited by an outer wall of the dispensing pump 3 in the axial direction at the top end thereof. This dispensing pump is shown in detail in FIG. 2. It comprises a piston body 10 with a piston section 11 and a cylinder body 20 with a cylinder section 21. The piston section 11 is slidably received in the cylinder section 21, a pump chamber 30 being defined between these two components. This pump chamber connects an inlet channel 24 and an outlet channel 14. Each of these channels has arranged therein a check valve 31, 32. Both check valves are installed such that they open in the same direction, i.e. in the dispensing direction. In addition, a resetting device, preferably a cylindrical spring 40, is arranged between the piston body 10 and the cylinder body 20 in such a way that it acts on the piston body 10 and the cylinder body 20 in a direction in which the pump chamber is enlarged so as to refill said pump chamber 30 after a pump stroke in the course of which the pump-chamber volume is reduced. Instead of a cylindrical spring 40 also other elastic elements can be used as a resetting device.

For limiting the maximum pump-chamber volume, limiting devices are provided on the piston body 10 and the cylinder body 20, said limiting devices coming into contact with one another when the maximum pump-chamber volume has been reached. In the embodiment shown, the limiting devices are implemented as projections 12, 22 on opposed walls 13, 23 of the piston body 10 and of the cylinder body 20. Each of these projections 12, 22 is in sliding engagement with the respective opposed wall so that the piston section 11 will be guided more stably on the cylinder section 21. The projections 12, 22, which can e.g. also be implemented as annular projections, prevent the dispensing pump 3 from falling apart. Their ramplike structural design permits easy assembly of the piston body 10 and of the cylinder body 20, simply by attaching one element to the other, whereby the ramps will snap in position one behind the other.

The piston body 10 and the cylinder body 20 are each bell-shaped. They are in engagement with one another and delimit the dispensing pump towards the outside so that a capsular housing is formed. Due to the fact that the projections 12, 22 are provided on radial walls 13, 23, a displacement of the piston body relative to the cylinder body results in a reduction of the axial length of the pump in the compressed condition, i.e. in the case of the minimum pump-chamber volume.

A radial outer wall 26 of the cylinder body 20 is additionally provided with at least one fastening projection 25, which may, for example, also be implemented as an annular projection. This fastening projection serves to secure the dispensing pump 3 in position in the installed condition between the holding element 8 of the head piece 2 and the storage container 1.

In the embodiment shown according to FIG. 1, the check valves 31, 32 are implemented as annular-gap valves provided with an annular valve body 35, 35', each of said annular valve bodies 35, 35' covering an annular gap 36, 36' of the inlet and outlet channels 14, 24, respectively. The check valve 32 arranged in the inlet channel 24 is secured in position on the cylinder body 20 by means of a retaining ring 34. The check valve 31 located on the side of the outlet channel 14 rests on the piston section 11, which is here implemented as a separate piston 11' attached to a outlet-channel section. By means of the radially symmetric structural design of the dispensing pump 3, a homogeneous dispensing behaviour is achieved. The dispensing pump 3 is, however, not limited to radially symmetric structural designs, but it may also have an arbitrary, e.g. square or polygonal cross-sectional shape. Instead of the annular-gap valves shown, also other known check valves, e.g. flap valves, may be used.

Furthermore, the piston 11' can be formed integrally with the piston body 10. A kinematic reversal of the dispensing pump 3 with a reversal of the opening direction of the check valves is possible as well. The fastening projections 25 should then be attached to the stationary part. All the components which are to be interconnected are preferably implemented as a snap-in connection so that the components can be assembled easily by joining them axially; this can also be done in an automated operation.

The dispensing pump 3 is followed by the head piece 2 comprising a movable part 7, a holding element 8 and a cap 9. The movable part 7 is provided with a dispensing channel 2*c* leading to an outlet opening. In the embodiment shown, the outlet opening is additionally provided with an automatically closing sealing-lip valve which prevents an ingress of foreign particles in the dispensing channel. The movable part 7 is movably arranged on the holding element 8 in the axial direction of the dispenser, which extends parallel to the axial direction of the dispensing pump, and is protected against removal toward the top in FIG. 1. The holding element 8 is provided with a fastening section, which is arranged on the holding-element end facing the storage container and through which said holding element can be secured to a fastening section provided in the area of the upper opening 6 of the storage container 1.

In the assembled condition of the dispenser, the fastening projection 25 of the dispensing pump is secured in position between the holding element of the head piece 2 and the upper edge of the storage container 1. When the dispenser is being assembled, the dispensing pump 3 can therefore be attached loosely to the storage container 1. The fastening is then effected simultaneously with the fastening of the head piece 2 on the storage container 1; for this purpose, a snap-in connection is preferably used, which permits the head piece to be simply pressed onto the storage container. The fastening device can be implemented such that it is releasable so as to permit the dispensing head, i.e. the dispensing pump 3 and the head piece 2, to be reused. In the first embodiment shown, no positive-engagement fastening means are necessary between the dispensing pump 3 and the storage container 1 and the dispensing pump 3 and the head piece 2.

Although the dispensing channel of the movable part is connected to the outlet channel 14 of the dispensing pump 3, forces applied to the head piece 2 from outside will be dissipated via the storage container 1 due to the fact that the head piece 2 is connected to said storage container 1.

Figure 5:
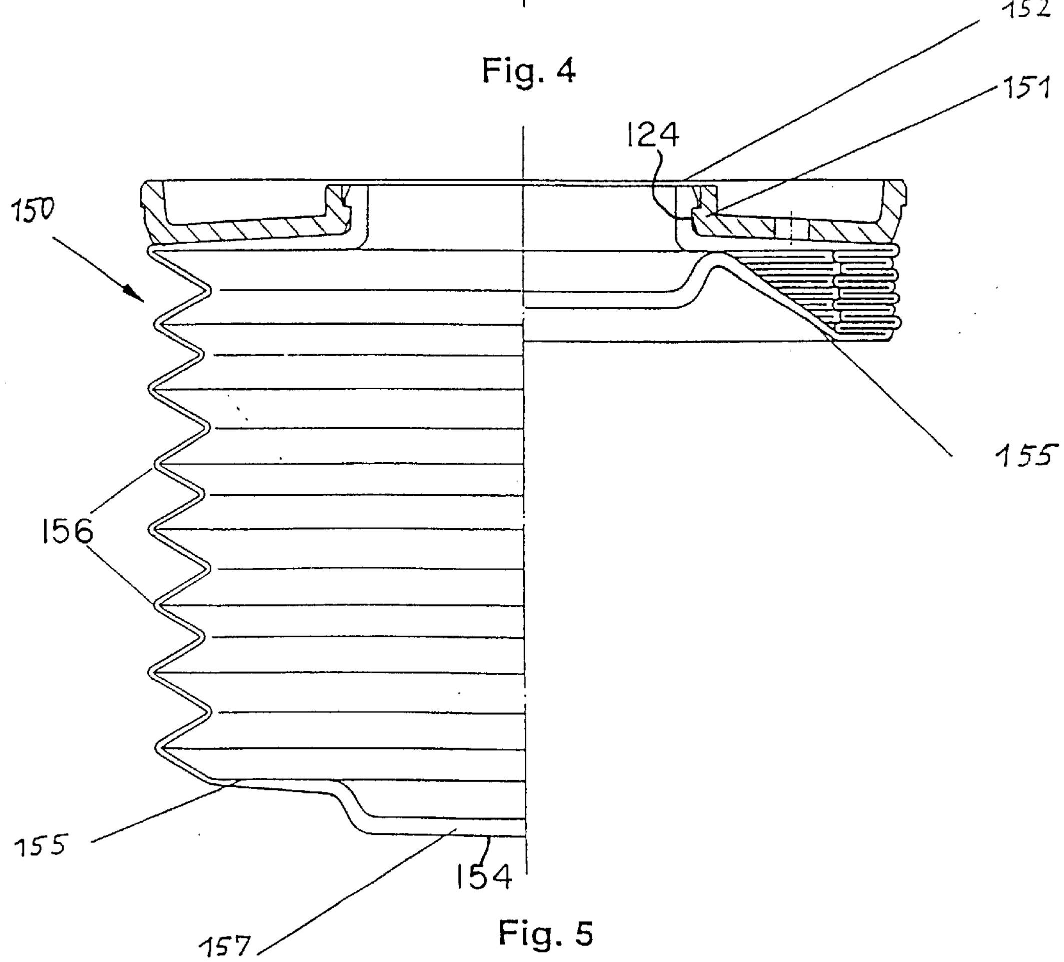
FIG. 5 shows a sectional view of the bellows of FIG. 3 in the full and in the empty condition.
Figure 6:
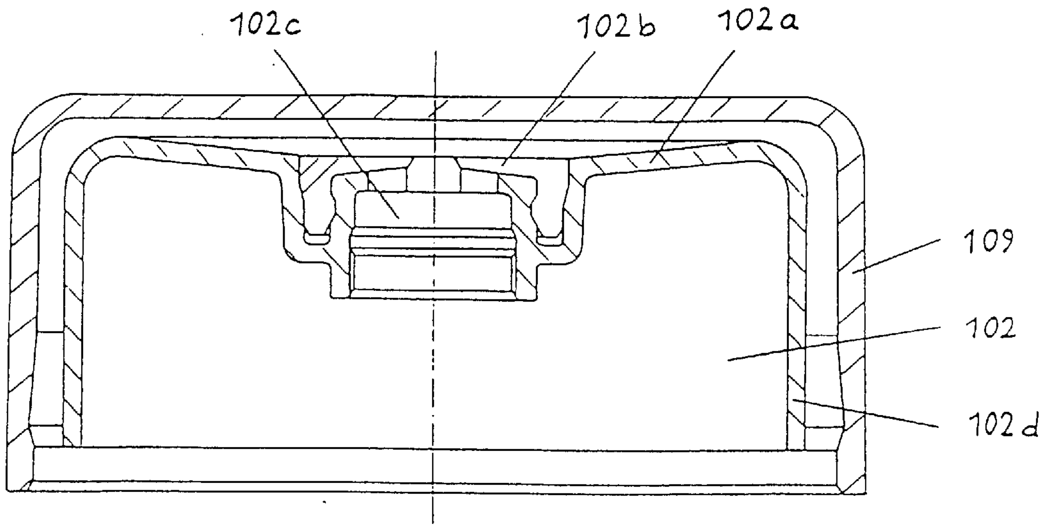
FIG. 6 shows a first head piece for the dispenser shown in FIG. 3.
Figure 7:
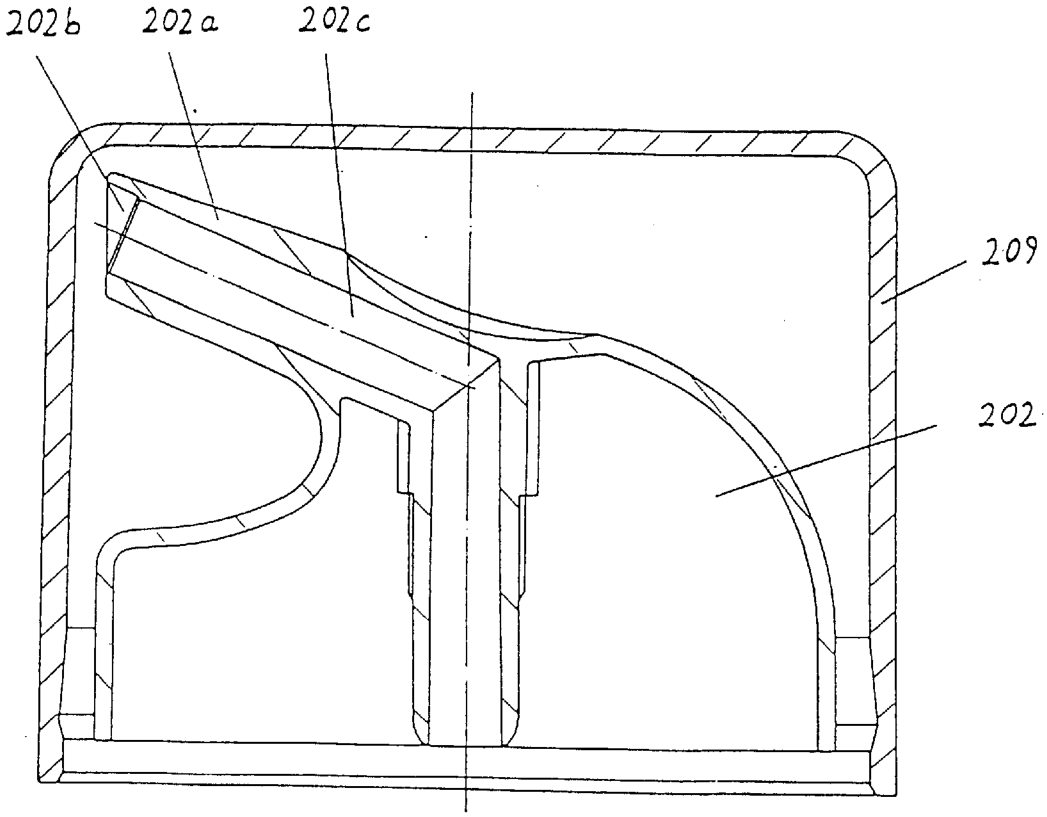
FIG. 7 shows a second head piece for the dispenser shown in FIG. 3, and FIGS. 8*a*–8*i* show a dispenser unit-assembly system comprising various head pieces, dispensing pumps and storage containers.
Figure 8A:
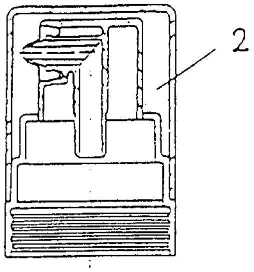
Figure 8B:
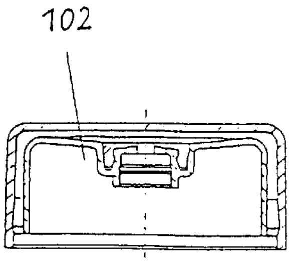
Figure 8C:
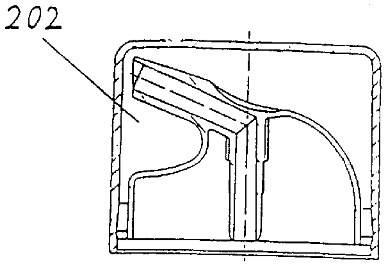
Figure 8D:
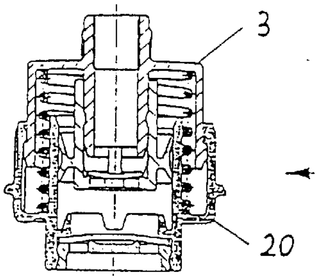
Figure 8E:
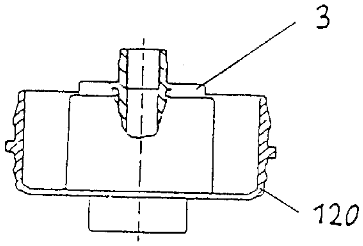
Figure 8F:
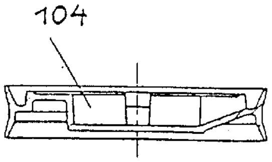
Figure 8G:
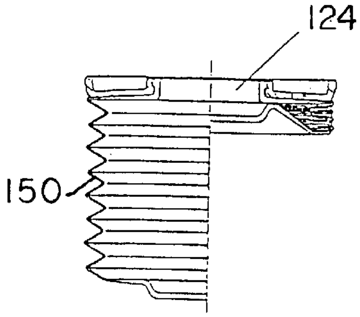
Figure 8H:
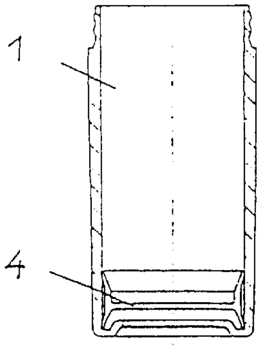
Figure 8I:
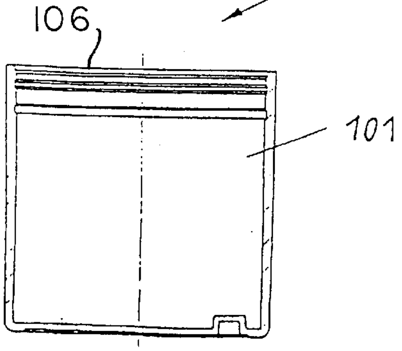

A further embodiment is shown in FIGS. 3 to 7, the head pieces shown in FIGS. 6 and 7 being mutually exchangeable.

The dispenser in FIG. 3 has, fundamentally, the same structural design as the dispenser in FIG. 1 so that only the differences existing with respect to the dispenser shown in FIG. 1 will be discussed in the following.

The dispensing pump 3 of the second embodiment is provided with a bell-shaped fastening flange 125 on the cylinder body 120, instead of the fastening projection 25 on the cylinder body 20, said fastening flange 125 surrounding the actual pump capsule radially. The circumference of the fastening flange 125 is provided with a stop 126 and with a fastening section 127 through which the dispensing pump 3 is adapted to be fixed in the area of the upper opening 106 of the storage container. On the opposite side of the stop 126, a further fastening section 128 is provided through which a cap 109 surrounding the actual head piece 102 can releasably be attached to the dispensing pump 3.

Figure 2:
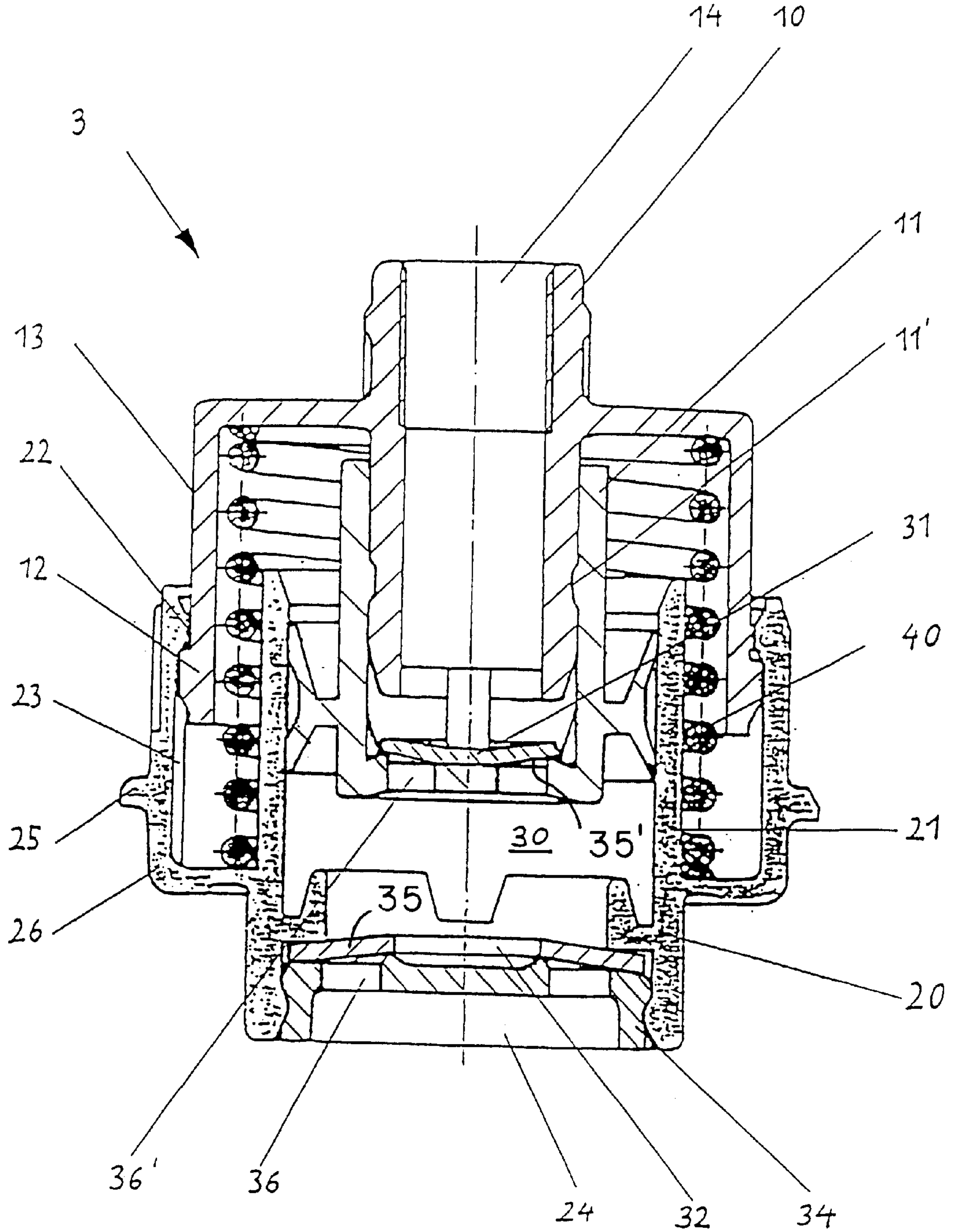
FIG. 2 shows a sectional view of the dispensing pump according to FIG. 1.

Between the actual pump capsule 129, whose structural design can correspond to that of the dispensing pump shown in FIG. 2, and the fastening flange 125 an annular gap is formed into which a radial circumferential section 102*d* of the head piece 102 extends.

A first head piece 102 which is adapted to be used in combination with the dispensing pump is shown in FIG. 6. This head piece has a substantially caplike shape on the end face 102*a* of which an outlet opening 102*b* is provided, which is protected against the ingress of foreign bodies by an automatically closing valve. A dispensing channel 102*c* leads to said outlet opening 102*b*, said dispensing channel being coupled to the outlet channel 114 of the dispensing pump in the attached condition of the head piece.

A second head piece 202 is shown in FIG. 7. This head piece 202, which has a caplike shape as well, is provided with an applicator 202*a* which is inclined relative to the axial direction of the dispenser. An outlet opening 202*b* is provided on one end of the applicator 202*a*, said outlet opening 202*b* being connected to the outlet channel 114 of the dispensing pump via a dispensing channel 202*c*.

In the embodiments shown in FIGS. 6 and 7, the head piece serves simultaneously as a dispensing key. The dispensing pump shown in FIG. 4 can, however, be coupled with any head piece having a known structural design, provided that the connecting dimensions between a dispensing channel of the head piece and the outlet channel 114 match.

As has been shown in the first embodiment, the storage container 101 can be implemented with a follow-up piston 104, the medium to be dispensed being then filled directly into the storage chamber.

Figure 3:
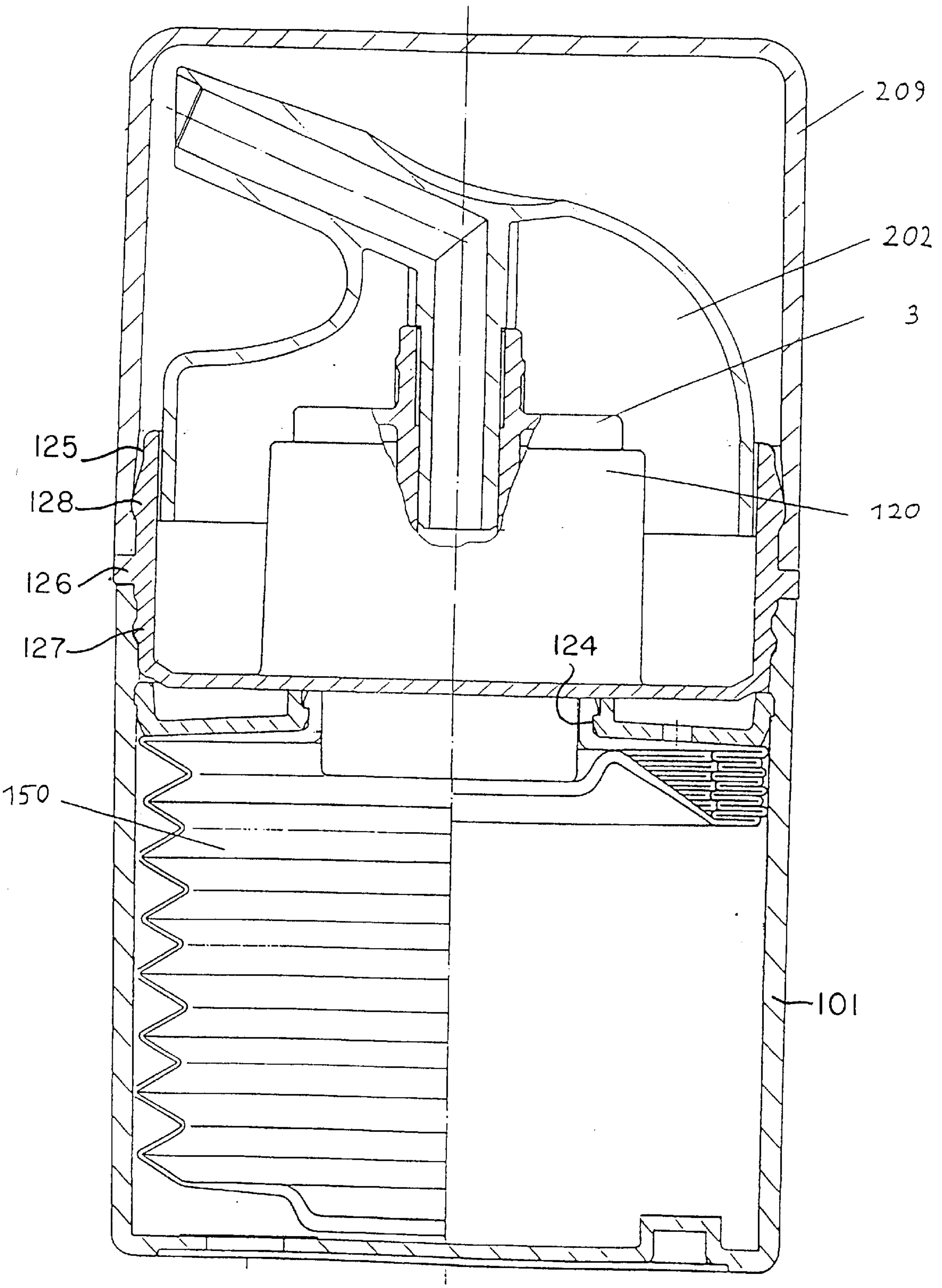
FIG. 3 shows a second embodiment of a dispenser in the assembled condition.
Figure 4:
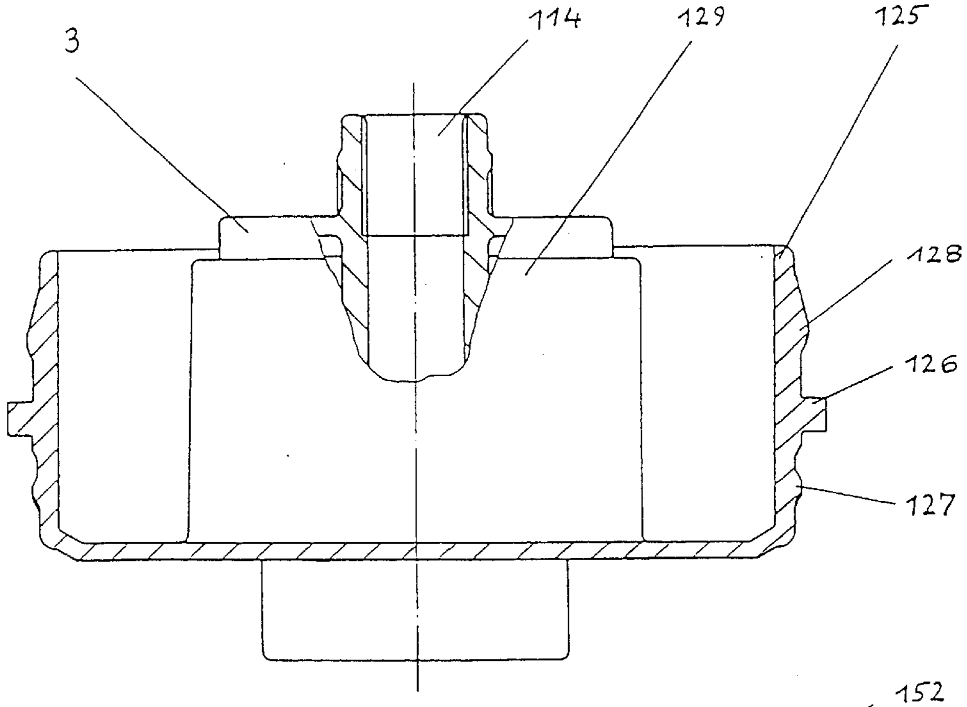
FIG. 4 shows a side view of the dispensing pump according to FIG. 3.

In the embodiment shown in FIGS. 3 and 5, a bellows 150, which accommodates the medium to be dispensed, is inserted into the storage chamber. The storage container 101 primarily serves to protect the bellows 150, which is preferably implemented as a corrugated bellows. The bellows 150 is adapted to be inserted into the storage container through the upper opening 106 and is additionally provided with a holding section 151 by means of which said bellows can be fixed to the storage container 101. The holding section 151 is preferably implemented as a separate retaining ring which is attached to a connection piece 152 of the bellows 150 via a snap-in connection and which is releasably secured in position in the storage container 101 through a further snap-in connection. The connection piece 152 of the bellows 150 is sealingly connected to the inlet channel 124 of the dispensing pump in the assembled condition of the dispenser. On the side located opposite the connection piece, the bellows is provided with a bottom flange 154 fulfilling here the function of the follow-up piston. The bottom flange 154 is provided with a flexible radially outer annular section 155 which is followed by the radial boundary wall of the bellows. When the bellows 150 is being emptied, this radial wall is folded up. For permitting orderly folding, preformed folds 156 are provided on the radial wall. This prevents the radial wall from closing the connection piece 152 prematurely under unfavourable conditions. For guaranteeing that the corrugated bellows is emptied as completely as possible, the annular section 155 is flexible so that, when the bellows has been emptied, said annular section can be deformed towards the bottom side, whereas a rigid part 157 of the bottom wall can be sucked up to the connection flange 152.

As has already been stated hereinbefore, various head pieces can be combined with the dispensing pump 3. Likewise, a storage container 101 with a corrugated bellows 150 can be used instead of a storage container 1 with a follow-up piston.

This modular structural design shown in FIGS. 8*a*–8*i* permits, in the form of a dispenser unit-assembly system, an individual adaptation of the dispensers to various products, without any necessity of developing a completely new dispenser for this purpose. A dispenser can therefore easily be adapted to the medium to be dispensed, the desired volumetric delivery per dispensing stroke, or the volume stored in the storage container, without any problems arising.

Especially the head piece can individually be adapted to the respective requirements with regard to the direction of the dispensing opening as well as with regard to the use of opening valves. The head pieces are not limited to those having a dispensing opening which is moved together with a dispensing key, but they may also comprise head pieces of the type having a stationary dispensing opening.

It follows that the dispensing system consisting of head pieces, storage containers and at least one dispensing pump permits a plurality of head pieces 2;102;202 to be combined with the same dispensing pump. Likewise, different storage containers can be combined with the dispensing pump.

As can be seen in the first embodiment, the head pieces can be implemented such that they can be fixed directly to the storage container. The individual modules of the dispensing system can be implemented in accordance with the respective dispensing pumps and dispensers and their components, which are claimed in the present application, but they are not limited to those.

The dispensing pump 3 of the dispenser unit-assembly system is adaptable, depending on the size and the diameter of the storage container. For this purpose it will suffice to replace, according to requirements, one cylinder body 20 by another cylinder body 120 provided with a fastening flange 125. All the other components of the dispensing pump 3 can be used with either cylinder body.

Preferably, all the components of the dispensing pump, of the dispenser and of the dispenser unit-assembly system can be produced as injection-moulded parts, also as injection-moulded parts consisting of plastic material that can be recycled. For the resetting device some other material may be chosen as well.

What is claimed is:

1. A modular dispenser for dispensing a fluid substance, comprising:

(a) a plurality of storage containers (1; 101) for receiving the fluid substance, each of said storage container having an upper portion containing an upper opening (6; 106);

(b) a plurality of dispensing head means (2; 102; 202) each including a dispensing passage (2*c*; 102*c*; 202*c*);

(c) dispensing pump means including:

(1) a vertically arranged tubular cylinder (20) having upper and lower ends;

(2) a piston (10) slidably mounted collinearly within said upper end of said cylinder, said piston having upper and lower ends, said piston containing a through bore extending between said upper and lower piston ends;

(3) said cylinder lower end having a lower inlet passage (24; 124) containing a first transverse wall defining a pump chamber (30) within the lower end of said cylinder said first transverse wall containing a plurality of first pump chamber inlet openings (36);

(4) first check valve means (32) normally closing said pump chamber inlet openings (36), thereby to control communication between said inlet passsage and said pump chamber via said inlet openings;

(5) said piston including a second transverse wall containing a plurality of second pump chamber openings (36'); and (6) second check valve means (31) carried by said piston lower end for normally closing said second pump chamber outlet openings (36'), thereby to control communication between said pump chamber and said piston through bore; and (d) means interchangeably connecting said dispensing pump between any one of said storage containers and any one of said dispensing head means, said dispensing pump inlet openings being arranged adjacent said storage container upper opening, thereby to permit direct contact of said inlet openings with the fluid material to be dispensed from the container, said dispensing pump outlet openings being in communication with said dispensing head dispensing passage, thereby to permit said dispensing pump means to be selectively connected with one of said storage containers and one of said dispensing head means, respectively.

2. A dispenser as defined in claim 1, wherein said means for removably connecting said pump means with said container includes external fastening projection means (25, 126) carried by the outer circumferential surface of said cylinder for engagement with said storage container when said pump means is mounted in said container upper opening, said dispensing head means being operable to retain said fastening projection means in engagement with said storage container.

3. A dispenser as defined in claim 2, wherein said dispensing head means includes a holding element (8) that is removably connected with said storage container.

4. A dispenser as defined in claim 1, wherein said piston is slidably displaceable between first and second positions relative to said cylinder in which said pumping chamber is expanded and contracted, respectively; and further including spring means (40) biasing said piston toward said first position.

5. A dispenser as defined in claim 4, and further including limiting means (12, 22) for limiting the extent of displacement of said piston relative to said cylinder when said piston is in said expanded position.

6. A dispenser as defined in claim 5, wherein said limiting means include outwardly and inwardly directed projections on the outer and inner circumferential surfaces of said piston and said cylinder, respectively, each of said projections being in sliding engagement with the corresponding circumferential surface of the associated pump member.

7. A dispenser as defined in claim 6, wherein said piston and said cylinder have oppositely arranged bell-shaped configurations.

8. A dispenser as defined in claim 1, wherein each of said first and second check valve means includes an annular check valve member.

9. A dispenser as defined in claim 1, wherein said piston comprises a pair of separable concentrically-arranged sections (11, 11'), respectively, said second check valve means being carried by one of said piston sections.

10. A dispenser as defined in claim 9, wherein said concentrically-arranged piston sections are connected by a snap fit.

11. A dispenser as defined in claim 1, wherein said storage container upper opening (6, 106) extends completely across the upper end of said container.

12. A dispenser as defined in claim 11, and further including bellows means (150) arranged in said storage container, the interior of said bellows means being in communication with said pump means inlet passage.

13. A dispenser as defined in claim 12, and further including an annular retaining ring (151) for connecting the upper end of said bellows means with said storage container opening.

14. A dispenser as defined in claim 13, wherein said bellows means has an annular upper inlet opening (152).

15. A dispenser as defined in claim 14, wherein said bellows means includes a bottom all having a rigid center portion (157), and a flexible annular portion (155) arranged concentrically about said center portion, said bellows means including a pleated side wall portion intermediate its top and bottom portions.

* * * * *